US011862415B2

(12) United States Patent
Ohtsuka et al.

(10) Patent No.: US 11,862,415 B2
(45) **Date of Patent: *Jan. 2, 2024**

(54) KEYSWITCH DEVICE AND KEYBOARD

(71) Applicant: FUJITSU COMPONENT LIMITED, Tokyo (JP)

(72) Inventors: Hiromi Ohtsuka, Tokyo (JP); Daisuke Taga, Tokyo (JP); Takuya Saitou, Tokyo (JP); Momosuke Nakahara, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,470

(22) Filed: Jul. 24, 2020

(65) Prior Publication Data

US 2020/0357581 A1 Nov. 12, 2020

Related U.S. Application Data

(63) Continuation of application No. 14/264,652, filed on Apr. 29, 2014, now Pat. No. 10,763,054.

(30) Foreign Application Priority Data

May 14, 2013 (JP) ................................ 2013-102410

(51) Int. Cl.
*H01H 3/12* (2006.01)
*H01H 13/79* (2006.01)
*H01H 13/807* (2006.01)

(52) U.S. Cl.
CPC ............ *H01H 3/125* (2013.01); *H01H 13/79* (2013.01); *H01H 13/807* (2013.01);
(Continued)

(58) Field of Classification Search
CPC ...... H01H 3/125; H01H 13/79; H01H 13/807; H01H 2203/054; H01H 2215/006;
(Continued)

(56) References Cited

U.S. PATENT DOCUMENTS 3,773,997 A 11/1973 Evans et al.
3,849,611 A 11/1974 Walker, Jr.
(Continued)

FOREIGN PATENT DOCUMENTS

CN 1177133 A 3/1998
CN 1604251 A 4/2005
(Continued)

OTHER PUBLICATIONS

Office Action dated Feb. 7, 2017 in corresponding Japanese Patent Application No. 2013-102410.
(Continued)

*Primary Examiner* — Lheiren Mae A Caroc
(74) *Attorney, Agent, or Firm* — STAAS & HALSEY LLP

(57) ABSTRACT

A keyswitch device which is provided with a support mechanism which supports a keytop in a movable manner, and a membrane sheet which has a plurality of upper electrodes and a plurality of lower electrodes which respectively correspond to the plurality of the upper electrodes and which form contact pairs with the corresponding upper electrodes. A plurality of contact pairs are arranged for a single keytop. The rubber cup pushes the plurality of contact pairs which are arranged for the single keytop.

5 Claims, 11 Drawing Sheets

(52) U.S. Cl.
CPC ... *H01H 2203/02* (2013.01); *H01H 2203/038* (2013.01); *H01H 2203/054* (2013.01); *H01H 2215/006* (2013.01)

(58) Field of Classification Search
CPC ......... H01H 2203/02; H01H 2203/038; H01H 13/14; H01H 13/20; H01H 13/705; H01H 2215/004; H01H 3/12
USPC ......................... 200/5 A, 513, 516, 406, 344
See application file for complete search history.

(56) References Cited

U.S. PATENT DOCUMENTS

| | | | | |
|---|---|---|---|---|
| 3,856,998 | A | 12/1974 | Sims, Jr. | |
| 4,515,999 | A | 5/1985 | Harper | |
| 4,584,444 | A | 4/1986 | Nagashima | |
| 4,604,509 | A * | 8/1986 | Clancy | H01H 13/702 200/513 |
| 4,755,645 | A | 7/1988 | Naoki et al. | |
| 5,203,448 | A | 4/1993 | Osada et al. | |
| 5,212,356 | A | 5/1993 | English | |
| 5,256,843 | A | 10/1993 | Chiba et al. | |
| 5,278,374 | A | 1/1994 | Takagi et al. | |
| 5,389,757 | A | 2/1995 | Souliere | |
| 5,401,926 | A | 3/1995 | Aoyama et al. | |
| 5,442,152 | A | 8/1995 | Huang | |
| 5,824,978 | A | 10/1998 | Karasik et al. | |
| 5,952,629 | A | 9/1999 | Yoshinaga et al. | |
| 5,967,298 | A | 10/1999 | Watanabe et al. | |
| 6,153,844 | A | 11/2000 | Hyono et al. | |
| 6,303,887 | B1 | 10/2001 | Ando | |
| 6,649,821 | B2 | 11/2003 | Inoue | |
| 6,693,246 | B1 | 2/2004 | Rudolph et al. | |
| 6,737,592 | B1 | 5/2004 | Hoang et al. | |
| 7,138,587 | B2 | 11/2006 | Nishino et al. | |
| 7,166,813 | B2 | 1/2007 | Soma et al. | |
| 7,217,893 | B1 | 5/2007 | Huang et al. | |
| 7,288,733 | B2 | 10/2007 | Yamada et al. | |
| 7,683,280 | B2 | 3/2010 | Hsu | |
| 7,952,043 | B2 | 5/2011 | Lin | |
| 9,741,507 | B2 * | 8/2017 | Nishino | H01H 13/7073 |
| 11,004,627 | B2 * | 5/2021 | Okutani | H01H 13/85 |
| 11,355,293 | B2 * | 6/2022 | Okutani | H01H 13/14 |
| 2001/0011999 | A1 | 8/2001 | Mochizuki | |
| 2002/0065054 | A1 | 5/2002 | Humphreys et al. | |
| 2006/0000694 | A1 | 1/2006 | Nishino et al. | |
| 2006/0113178 | A1 | 6/2006 | Soma et al. | |
| 2007/0125626 | A1 | 6/2007 | Yamada et al. | |
| 2009/0224948 | A1 | 9/2009 | Nishino et al. | |
| 2009/0277766 | A1 | 11/2009 | Fujitsuna | |
| 2010/0078301 | A1 | 4/2010 | Yeh | |
| 2011/0127152 | A1 | 6/2011 | Hu | |
| 2011/0297523 | A1 | 12/2011 | Tsai | |
| 2012/0199458 | A1 | 8/2012 | Takemae et al. | |
| 2013/0140164 | A1 | 6/2013 | Chen | |
| 2014/0339065 | A1 * | 11/2014 | Ohtsuka | H01H 13/79 200/5 A |
| 2015/0170854 | A1 | 6/2015 | Nishino et al. | |
| 2015/0199023 | A1 | 7/2015 | Hu et al. | |
| 2018/0286604 | A1 * | 10/2018 | Okutani | H01H 13/14 |
| 2020/0135417 | A1 * | 4/2020 | Okutani | H01H 13/14 |
| 2020/0357581 | A1 | 11/2020 | Ohtsuka et al. | |

FOREIGN PATENT DOCUMENTS

| | | | |
|---|---|---|---|
| CN | 1716483 | A | 1/2006 |
| CN | 1747092 | A | 3/2006 |
| CN | 101297385 | A | 10/2008 |
| CN | 101770250 | A | 7/2010 |
| CN | 104715953 | A | 6/2015 |
| JP | 64-65732 | | 3/1989 |
| JP | 2-27622 | | 2/1990 |
| JP | 2-132718 | | 5/1990 |
| JP | 3-57114 | | 3/1991 |
| JP | 3-98219 | | 4/1991 |
| JP | 4-123727 | | 4/1992 |
| JP | 4-272625 | | 9/1992 |
| JP | 4-301331 | | 10/1992 |
| JP | 5-66832 | | 9/1993 |
| JP | 5-234460 | | 9/1993 |
| JP | 5-342944 | | 12/1993 |
| JP | 6-103851 | | 4/1994 |
| JP | 7-226123 | | 8/1995 |
| JP | 9-27235 | | 1/1997 |
| JP | 9-213165 | | 8/1997 |
| JP | 11-3628 | | 1/1999 |
| JP | 11-306908 | | 11/1999 |
| JP | 11-339590 | | 12/1999 |
| JP | 2000-235820 | | 8/2000 |
| JP | 2001-202849 | | 7/2001 |
| JP | 2003-263931 | | 9/2003 |
| JP | 2004-139752 | | 5/2004 |
| JP | 2006-49274 | | 2/2006 |
| JP | 2006-156170 | | 6/2006 |
| JP | 2007-156709 | | 6/2007 |
| JP | 2009-211930 | | 9/2009 |
| JP | 2011-249282 | | 12/2011 |
| JP | 2011-253685 | | 12/2011 |
| JP | 2013-254615 | | 12/2013 |
| JP | 2015-133309 | | 7/2015 |
| TW | 200847211 | | 12/2008 |
| TW | M377636 | U1 | 4/2010 |
| TW | 201602862 | A | 1/2016 |
| WO | 2007/114631 | A2 | 10/2007 |

OTHER PUBLICATIONS

U.S. Appl. No. 14/264,652, filed Apr. 29, 2014, Hiromi Ohtsuka, Fujitsu Component Limited.
Office Action dated Feb. 7, 2017 in Japanese Patent Application No. 2013-102410 corresponding to U.S. Appl. No. 14/264,652.
U.S. Office Action dated Oct. 9, 2015 from U.S. Appl. No. 14/264,652.
U.S. Office Action dated May 12, 2016 from U.S. Appl. No. 14/264,652.
U.S. Office Action dated Sep. 2, 2016 from U.S. Appl. No. 14/264,652.
U.S. Office Action dated May 2, 2017 from U.S. Appl. No. 14/264,652.
U.S. Office Action dated Nov. 15, 2017 from U.S. Appl. No. 14/264,652.
U.S. Office Action dated Apr. 9, 2018 from U.S. Appl. No. 14/264,652.
U.S. Office Action dated Oct. 25, 2018 from U.S. Appl. No. 14/264,652.
U.S. Office Action dated Feb. 8, 2019 from U.S. Appl. No. 14/264,652.
U.S. Office Action dated Aug. 1, 2019 from U.S. Appl. No. 14/264,652.
U.S. Office Action dated Jan. 15, 2020 from U.S. Appl. No. 14/264,652.
U.S. Notice of Allowance dated May 7, 2020 from U.S. Appl. No. 14/264,652.
U.S. Notice of Allowance dated Jan. 13, 2021 in U.S. Appl. No. 15/886,253.
U.S. Notice of Allowance dated Jan. 26, 2021 in U.S. Appl. No. 16/513,046.
Japanese Office Action dated Oct. 27, 2020 in Japanese Patent Application No. 2017-069263.
Taiwan Office Action dated Apr. 8, 2020 in Taiwan Patent Application No. 107103377.
U.S. Office Action dated Sep. 2, 2020 in U.S. Appl. No. 16/513,046.
U.S. Office Action dated Aug. 17, 2020 in U.S. Appl. No. 15/886,253.
U.S. Notice of Allowance dated May 7, 2019 in U.S. Appl. No. 15/610,771.
U.S. Notice of Allowance dated Jun. 20, 2017 in U.S. Appl. No. 14/558,794.
U.S. Office Action dated Feb. 28, 2020 in U.S. Appl. No. 15/886,253.
Office Action for U.S. Appl. No. 15/610,771, dated Jul. 3, 2017.
Office Action for U.S. Appl. No. 15/610,771, dated Dec. 11, 2017.
Chinese Office Action dated Mar. 29, 2017 in corresponding Chinese Patent Application No. 201410767031.X.
Chinese Office Action dated Sep. 14, 2017 in corresponding Chinese Patent Application No. 201410767031.X.

(56) References Cited

OTHER PUBLICATIONS

Japanese Office Action dated Jan. 23, 2018 in corresponding Japanese Patent Application No. 2014-138828.
Japanese Platform for Patent Information English abstract for Japanese Patent Publication No. 2006-156170, published Jun. 15, 2006.
Jun. 20, 2017 Notice of Allowance in U.S. Appl. No. 14/558,794 (now U.S. Pat. No. 9,741,507).
Japanese Platform for Patent Information English abstract for Japanese Patent Publication No. 64-65732, published Mar. 13, 1989.
Japanese Platform for Patent Information English abstract for Japanese Patent Publication No. 2015-133309, published Jul. 23, 2015.
Patent Abstracts of Japan, Publication No. 03-057114, published Mar. 12, 1991.
Patent Abstracts of Japan, Publication No. 04-272625, published Sep. 29, 1992.
Espacenet Bibliographic data, Publication No. JPH0566832 (U), published Sep. 3, 1993.
Patent Abstracts of Japan, Publication No. 05-234460, published Sep. 10, 1993.
Patent Abstracts of Japan, Publication No. 05-342944, published Dec. 24, 1993.
Patent Abstracts of Japan, Publication No. 06-103851, published Apr. 15, 1994.
Patent Abstracts of Japan, Publication No. 07-226123, published Aug. 22, 1995.
Patent Abstracts of Japan, Publication No. 09-027235, published Jan. 28, 1997.
Patent Abstracts of Japan, Publication No. 09-213165, published Aug. 15, 1997.
Patent Abstracts of Japan, Publication No. 11-003628, published Jan. 6, 1999.
Patent Abstracts of Japan, Publication No. 11-339590, published Dec. 10, 1999.
Patent Abstracts of Japan, Publication No. 2000-235820, published Aug. 29, 2000.
Patent Abstracts of Japan, Publication No. 2001-202849, published Jul. 27, 2001.
Patent Abstracts of Japan, Publication No. 2009-211930, published Sep. 17, 2009.
Patent Abstracts of Japan, Publication No. 2011-249282, published Dec. 8, 2011.
Patent Abstracts of Japan, Publication No. 2011-253685, published Dec. 15, 2011.
Patent Abstracts of Japan, Publication No. 2013-254615, published Dec. 19, 2013.
Sipo English Patent Abstract, Publication No. 1716483 A, Published Jan. 4, 2006.
Sipo English Patent Abstract, Publication No. 1177133 A, Published Mar. 25, 1998.
Espacenet English Abstract, Publication No. 1747092 A, Published Mar. 15, 2006.
Sipo English Patent Abstract, Publication No. 1604251 A, Published Apr. 6, 2005.
Chinese Office Action dated Jul. 20, 2016 in corresponding Chinese Patent Application No. 201410767031.X.
English translation of Japanese Reference No. 2006-079925, published Mar. 23, 2016 (Corresponding to Ref. BP).
J-PlatPat English Patent Abstract, Publication No. 2006-079925, Published Mar. 23, 2006.
Office Action for U.S. Appl. No. 14/558,794, dated Jan. 22, 2016.
Office Action for U.S. Appl. No. 14/558,794, dated Jun. 15, 2016.
Office Action for U.S. Appl. No. 14/558,794, dated Sep. 22, 2016.
Office Action for U.S. Appl. No. 14/558,794, dated Feb. 8, 2017.
Japanese Platform for Patent Information English abstract for Japanese Patent Publication No. 4-301331, published Oct. 23 1992.
Office Action dated Mar. 30, 2018 in U.S. Appl. No. 15/610,771.
Espacenet English abstract for Chinese Patent Publication No. 101297385 A, published Oct. 29, 2008.
Espacenet English abstract for Taiwanese Patent Publication No. 200847211, published Dec. 1, 2008.
Espacenet English abstract for Taiwanese Patent Publication No. 201602862 A, published Jan. 16, 2016.
Espacenet English abstract for Taiwanese Utility Model No. M377636U1, published Apr. 1, 2010.
Espacenet English abstract for Chinese Patent Publication No. 101770250 A, published Jul. 7, 2010.
Taiwanese Office Action dated Sep. 13, 2018 in corresponding Taiwanese Patent Application No. 107103377.
Japanese Platform for Patent Information English abstract for Japanese Patent Publication No. 2004-139752, published May 13, 2004.
Chinese Office Action dated Jan. 25, 2019 in corresponding Chinese Patent Application No. 201710424845.7.
Espacenet English abstract for Chinese Patent Publication No. 104715953 A, published Jun. 17, 2015.
Chinese Office Action dated Mar. 4, 2019 in corresponding Chinese Patent Application No. 201810202347.2.
Taiwanese Office Action dated Jun. 5, 2019 in corresponding Taiwanese Patent Application No. 107103377.
U.S. Office Action dated Oct. 5, 2018 in U.S. Appl. No. 15/886,253.
U.S. Office Action dated Mar. 11, 2019 in U.S. Appl. No. 15/886,253.
U.S. Office Action dated Jul. 15, 2019 in U.S. Appl. No. 15/886,253.
U.S. Office Action dated Mar. 23, 2020 in U.S. Appl. No. 16/729,943.
U.S. Office Action dated Oct. 9, 2020 in U.S. Appl. No. 16/729,943.
U.S. Office Action dated Jun. 10, 2021 in U.S. Appl. No. 16/729,943.
U.S. Notice of Allowance dated Dec. 29, 2021 in U.S. Appl. No. 16/729,943.
U.S. Notice of Allowance dated Feb. 14, 2022 in U.S. Appl. No. 16/729,943.
U.S. Appl. No. 16/729,943, filed Dec. 30, 2019, Shinnosuke Okutani, Fujitsu Component Limited.

* cited by examiner

KEYSWITCH DEVICE AND KEYBOARD

CROSS-REFERENCE TO RELATED APPLICATIONS

This application is a continuation of U.S. patent application Ser. No. 14/264,652, filed Apr. 29, 2014 which is based upon and claims the benefit of priority of the prior Japanese Patent Application No. 2013-102410, filed May 14, 2013, the entire contents of which are incorporated herein by reference.

BACKGROUND OF THE INVENTION

1. Field of the Invention

The present invention relates to a keyswitch device and to a keyboard which is provided with the keyswitch device.

2. Description of the Related Art

A keyswitch device is used in control panels, etc., of industrial machinery for inputting predetermined information to a main apparatus. Alternatively, a keyboard which is provided with a plurality of keyswitch devices is used. In a keyboard, keyswitch devices are arranged for specific predetermined information. On the surfaces of each keytop, a letter to be input or control content or other input information is engraved. When a keytop is pushed, a key input signal which corresponds to the input information which is engraved on the keytop is sent to the main apparatus. Such a keyboard is used not only for control panels of industrial machinery, but also POS (Point of Sales) systems of stores etc.

Japanese Patent Publication No. 2003-263931A discloses an operating device comprising a board on the surface of which a pair of conductor patterns are formed and with the pair of conductor patterns connected to each other. In this operating device, a pushing member is arranged facing the pair of conductor patterns. The pushing member is supported by an elastic member to be able to move in the up-down direction. The elastic member is provided with a contact which faces the conductor patterns. It is disclosed that electrical connection of the pair of conductor patterns is obtained by the contact touching the pair of conductor patterns.

Japanese Patent Publication No. 2-132718A discloses a membrane switch which comprises a lower electrode pattern which is formed integrally with the main apparatus and an upper electrode which is arranged at a back surface of a pushing part of the keyboard and faces the lower electrode pattern. In this membrane switch, it is disclosed that an adhesive tape or a binder and the work of applying these are not required, since the lower electrode is formed integrally with the main apparatus.

In a keyswitch device which is used for industrial machinery etc., by providing a disc spring and pushing the keytop, the disc spring is inverted to obtain electrical connection. Such a device is being often employed.

Further, a keyswitch device of the membrane contact type is also being employed. A membrane contact type keyswitch device is provided with membrane sheet. The membrane sheet is pushed to obtain electrical connection. The membrane sheet may be directly pushed or may be pushed by a hollow elastic member called a “rubber cup”. A keytop is, for example, arranged at the top surface of a semispherical rubber cup and is supported by the rubber cup. In this case, a mechanism with no member for guiding sliding of the keytop is often employed.

In particular, in industrial machinery etc., sometimes oil, dust, or other foreign matter enters the keyswitch device. When a member is arranged for guiding the keytop by sliding, if foreign matter enters the keyswitch device, the keytop will no longer be able to smoothly move. For this reason, a mechanism which comprises only the above such rubber cup to support the keytop is mainly used.

In this regard, in recent years, sometimes it is desired to push a single keytop so as to connect two independent electrical circuits. In such a device, by arranging two contact pairs for one electrical circuit and another electrical circuit inside a single keyswitch device and pushing the keytop, it is possible to simultaneously connect the two contact pairs.

In such a keyswitch device which simultaneously connects two contact pairs, there was the problem that the above such mechanism which is provided with a disc spring or mechanism which uses a rubber cup to support the keytop was not suitable. For example, in a mechanism which uses a rubber cup to support the keytop, if pushing a position which deviates from the center of the keytop, the keytop would end up tilting, so sometimes the two contact pairs cannot be stably connected.

SUMMARY OF THE INVENTION

The keyswitch device of the present invention is provided with a moving member which moves by being pushed, a support mechanism which supports the moving member in a movable manner, and an electrical connection member which has a plurality of upper electrodes and a plurality of lower electrodes. Each of the lower electrodes respectively corresponds to one of the plurality of the upper electrodes and forms a contact pair with the corresponding upper electrode. A plurality of contact pairs are arranged for each of moving member, and an elastic member pushes the plurality of the contact pairs which are arranged for the single moving member.

The keyboard of the present invention is a keyboard on which a plurality of the above keyswitch devices are arranged.

DESCRIPTION OF EMBODIMENTS

Referring to FIG. 1 to FIG. 22, a keyswitch device and keyboard of an embodiment will be explained. In the present embodiment, a keyswitch device which is arranged at the keyboard is explained as an example.

Figure 1:
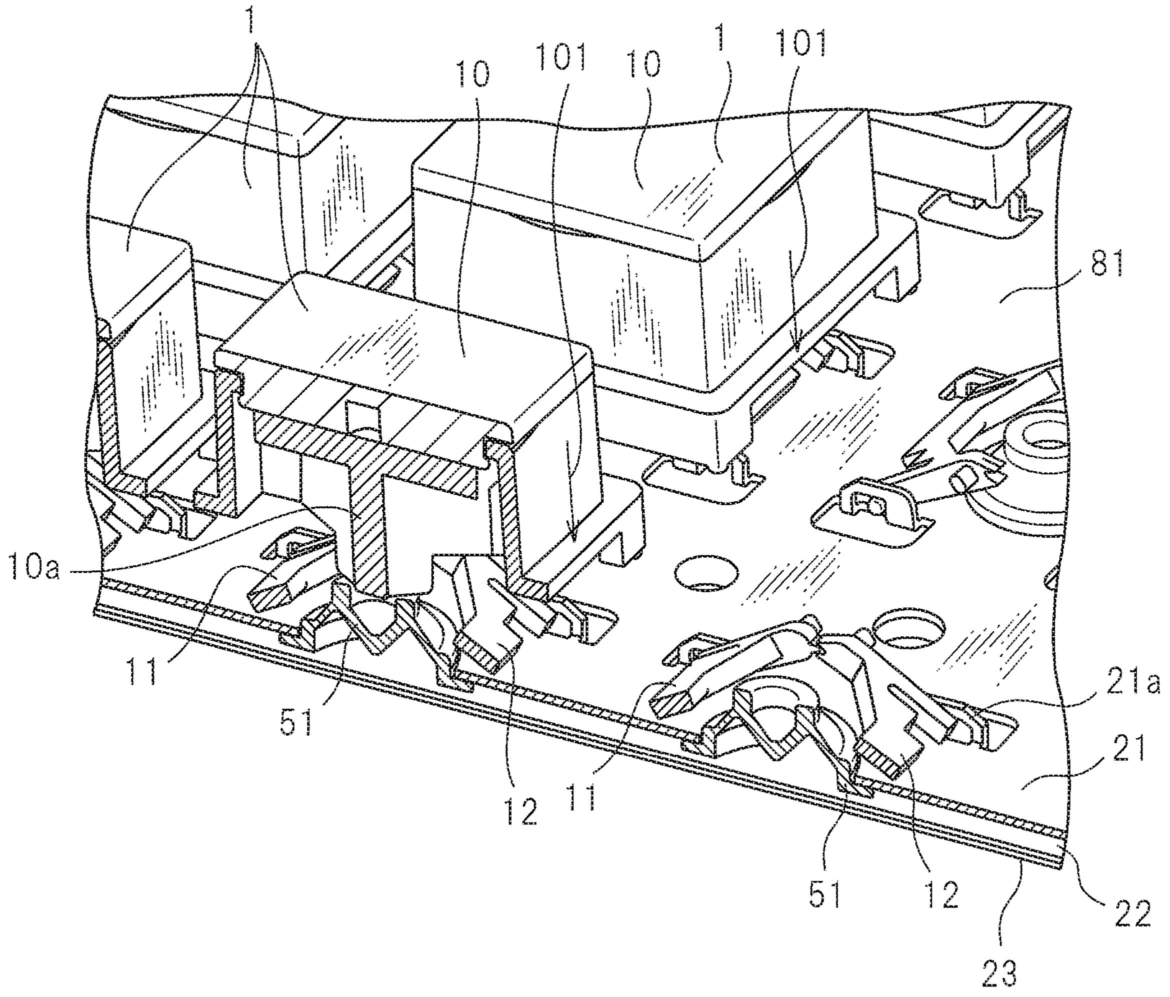
FIG. 1 is a perspective view of a keyboard of an embodiment.

FIG. 1 is a perspective view of the keyboard in the present embodiment when cutting along its part. FIG. 1 shows the state where a cover member etc. at the surface of the keyboard is detached and keytops 10 are detached from some of the keyswitch devices 1. The keyboard 81 in the present embodiment includes a plurality of keyswitch devices 1. The plurality of keyswitch devices 1 are arranged aligned. The keyboard 81 in the present embodiment has a base member 21. The base member 21 in the present embodiment has the plurality of keyswitch devices 1 attached to it.

Figure 2:
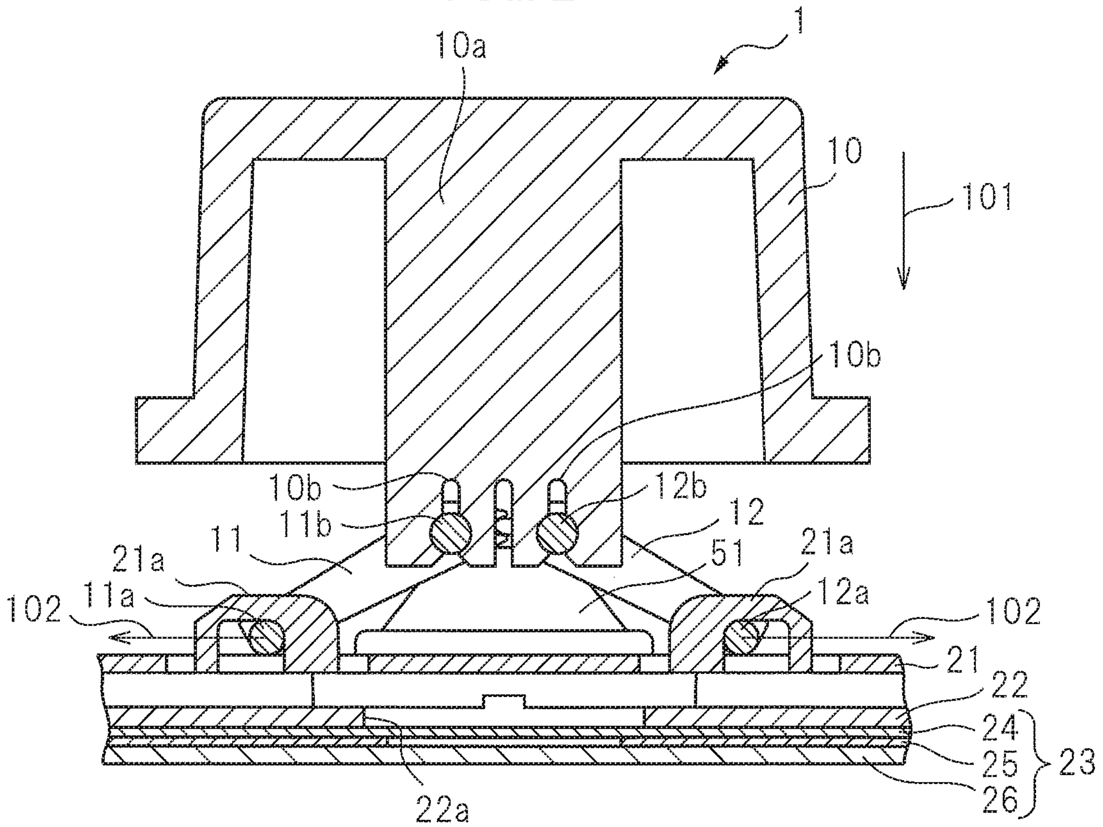
FIG. 2 is a first cross-sectional view of a keyswitch device of an embodiment.

FIG. 2 is a cross-sectional view of a keyswitch device in the present embodiment. The keyswitch device 1 shown in FIG. 1 and FIG. 2 is provided with a keytop 10 functions as a moving member which moves when the user pushes it down. In the keyswitch device 1 of the present embodiment, movement of the keytop 10 causes electrical connection of the contact pair which is arranged inside of the keyswitch device 1.

The keyswitch device of the present embodiment is provided with a support mechanism that includes a gear link which supports the keytop 10 in a movable manner. The gear link mechanism includes a plurality of link members 11 and 12. The keytop 10 is supported by the base member 21 through the link members 11 and 12. At the downside of the base member 21, a support member 22 is arranged. An elastic member including a rubber cup 51 is arranged between the support member 22 and the keytop 10. The rubber cup 51 has elasticity and biases the keytop 10 in a direction where the keytop is separated from the base member 21. The support member 22 supports the rubber cup 51. The support member 22 is formed with a hole 22*a* so that the rubber cup 51 can contact a membrane sheet 23.

At the downside side of the support member 22, an electrical connection member, namely the membrane sheet 23 is arranged. The membrane sheet 23 in the present embodiment, as explained later, is formed so that a single key operation enables a plurality of contact pairs to be substantially simultaneously and individually connected.

The keytop 10 in the present embodiment is formed in a box shape. The keytop 10 has a pushing part 10*a* which pushes the rubber cup 51. The pushing part 10*a* in the present embodiment is arranged in a region at the approximate center of the inside of the keytop 10. The pushing part 10*a* includes an insert part 10*b* with a notched end. A frame 21*a* is formed at the front surface of the base member 21.

The link members 11 and 12 have slide shafts 11*a* and 12*a* at one end and have pivot shafts 11*b* and 12*b* at the other end respectively. The slide shafts 11*a* and 12*a* of the link members 11 and 12 are inserted to the frame parts 21*a* of the base member 21 and are supported to be able to slide along the front surface of the base member 21. Each of the pivot shafts 11*b* and 12*b* of the link members 11 and 12 is inserted into the insert part 10*b* which is formed at the pushing part 10*a* and is pivotally supported at the insert part 10*b*.

Figure 3:
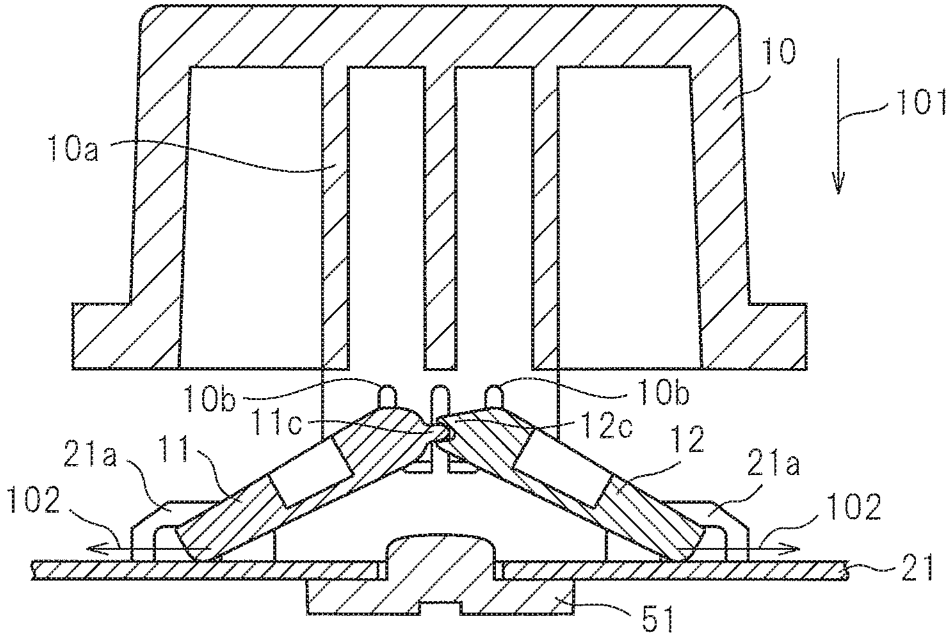
FIG. 3 is a second cross-sectional view of a keyswitch device of an embodiment.

FIG. 3 is a cross-sectional view when cutting the keyswitch device at the part where the plurality of link members 11 and 12 are arranged. The support mechanism in the present embodiment has an engagement part where the link members 11 and 12 engage with each other. The link members 11 and 12 in the present embodiment have tooth parts 11*c* and 12*c* at the front ends of the other ends. The engagement part is formed so that the tooth part 11*c* and the tooth part 12*c* mesh with each other.

In the keyswitch device 1 shown in FIG. 2 and FIG. 3, the keytop 10 moves toward the base member 21 as shown by arrow 101 when a user pushes the keytop 10. At this time, the pivot shafts 11*b* and 12*b* of the link members 11 and 12 are pushed by the keytop 10 and the link members 11 and 12 are driven. When the link members 11 and 12 are driven, the slide shafts 11*a* and 12*a* slide at the frame parts 21*a* as shown by arrows 102.

Further, as shown in FIG. 3, since the tooth part 11*c* of the link member 11 and the tooth part 12*c* of the link member 12 engage, when one of the link members 11 and 12 is driven, the other is driven through the engagement part. For example, even when the keytop 10 is pushed in a slanted direction, since the tooth part 11*c* and the tooth part 12*c* are engaged, the link members 11 and 12 may simultaneously move. That is, the link members 11 and 12 are interlinked through the tooth parts 11*c* and 12*c*. Thus, the keytop 10 moves in a direction substantially vertically with respect to the front surface of the base member 21 as shown by arrow 101.

Figure 4:
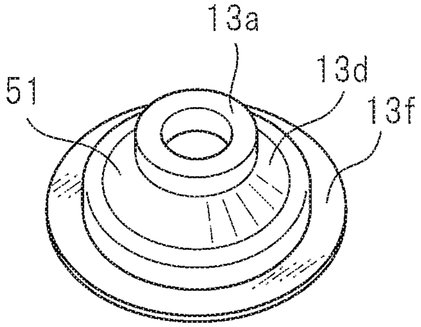
FIG. 4 is a perspective front side view of a first rubber cup of an embodiment.
Figure 5:
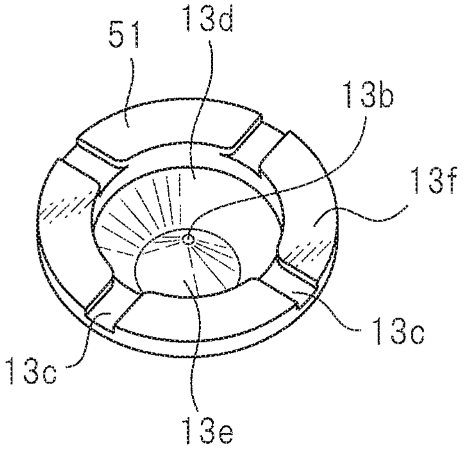
FIG. 5 is a perspective back side view of the first rubber cup of an embodiment.
Figure 6:
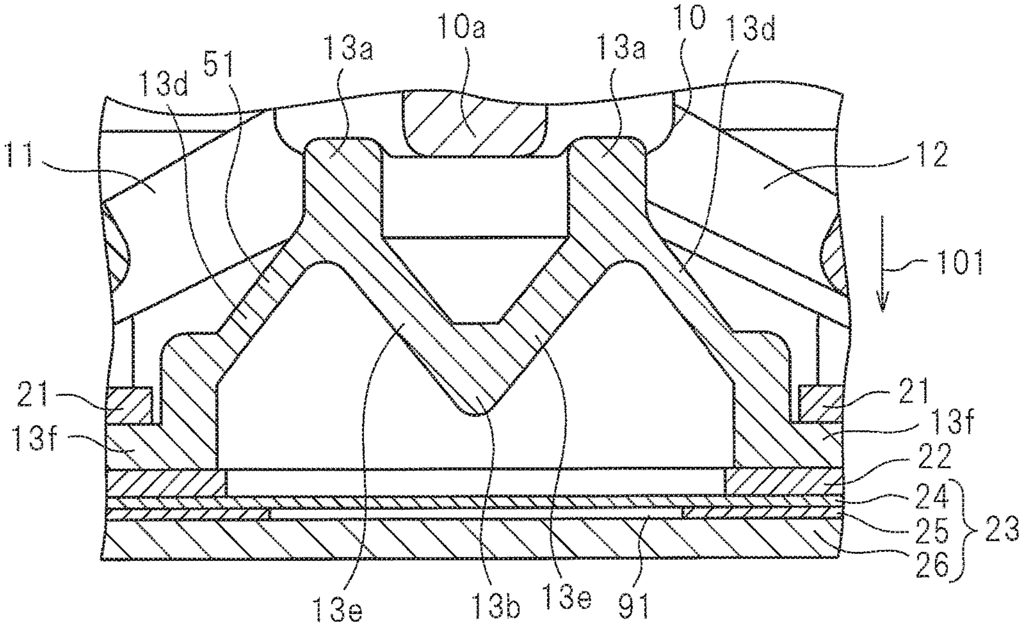
FIG. 6 is a cross-sectional view of a part of a rubber cup in a keyswitch device of an embodiment.

FIG. 4 is a perspective view of a first rubber cup in the present embodiment as seen from a front side. FIG. 5 is a perspective view of the first rubber cup in the present embodiment when seen from a back side. FIG. 6 is a cross-sectional view of the first rubber cup in the present embodiment. The first rubber cup 51 shown in FIGS. 4 to 6 is formed by a deformable material. The first rubber cup 51 has an abutting part 13*a* which abuts against the keytop 10. The abutting part 13*a* is formed in a ring shape. The abutting part 13*a* of the rubber cup 51 is pushed by the pushing part 10*a* of the keytop 10.

The first rubber cup 51 has a flange 13*f* for supporting the rubber cup 51 from the downside. The rubber cup 51 is fastened by the flange 13*f* being clamped between the support member 22 and the base member 21. Further, the flange 13*f* includes recesses 13*c* through which air passes when the rubber cup 51 is deformed.

The rubber cup 51 has a first deforming part including a deforming part 13*d* which is formed between the abutting part 13a and the part 13f. The deforming part 13d is formed so as to deform when the abutting part 13a is pushed and to supply reactive force to the keytop 10. The deforming part 13d is formed so as to deform by buckling when the abutting part 13a is pushed and to return to its original shape when the pushing force is released.

The first rubber cup 51 has a second deforming part including a deforming part 13e. The deforming part 13e in the present embodiment is arranged inside of the abutting part 13a. The deforming part 13e shown in FIG. 5 is in a substantially conical shape and v-shape in cross-section. The rubber cup 51 has a pushing part 13b at the end of the deforming part 13e. The pushing part 13b is arranged so as to face the membrane sheet 23. The pushing part 13b is a part which pushes the membrane sheet 23.

In the state where the pushing part 13b contacts the membrane sheet 23, the deforming part 13e deforms by pushing the keytop 10. The deforming part 13e is formed so as to deform by the pushing force of the keytop 10 and the reactive force from the membrane sheet 23.

Figure 7:
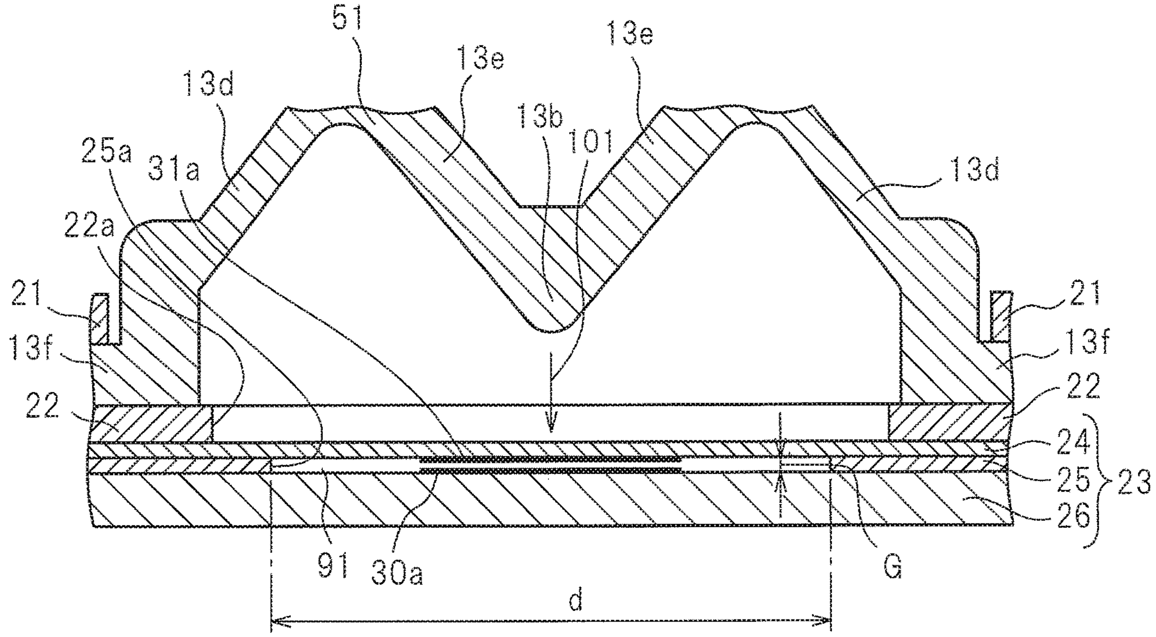
FIG. 7 is an enlarged cross-sectional view of a part of a membrane sheet in a keyswitch device of an embodiment.

FIG. 7 is an enlarged cross-sectional view of the first membrane sheet in the present embodiment. The first membrane sheet 23 is arranged beneath the support member 22. The membrane sheet 23 includes an upper layer 24, a lower layer 26, and a spacer 25 which forms a gap between the upper layer 24 and the lower layer 26. The spacer 25 is formed with a hole 25a. A gap 91 is formed between the upper layer 24 and the lower layer 26.

Inside the region where the gap 91 is formed, a contact 31a of the upper electrode is formed on a surface of the upper layer 24 facing the lower layer 26. Further, a contact 30a of the lower electrode is formed on the surface of the lower layer 26. One contact part 31a of the upper electrode and one contact part 30a of the lower electrode configure one contact pair. A plurality of contact pairs is formed on the first membrane sheet 23 for a single rubber cup 51. In the present embodiment, the contact of the upper electrode and the contact of the lower electrode have substantially the same planar shapes. Further, the contact of the upper electrode and the contact of the lower electrode face each other.

Figure 8:
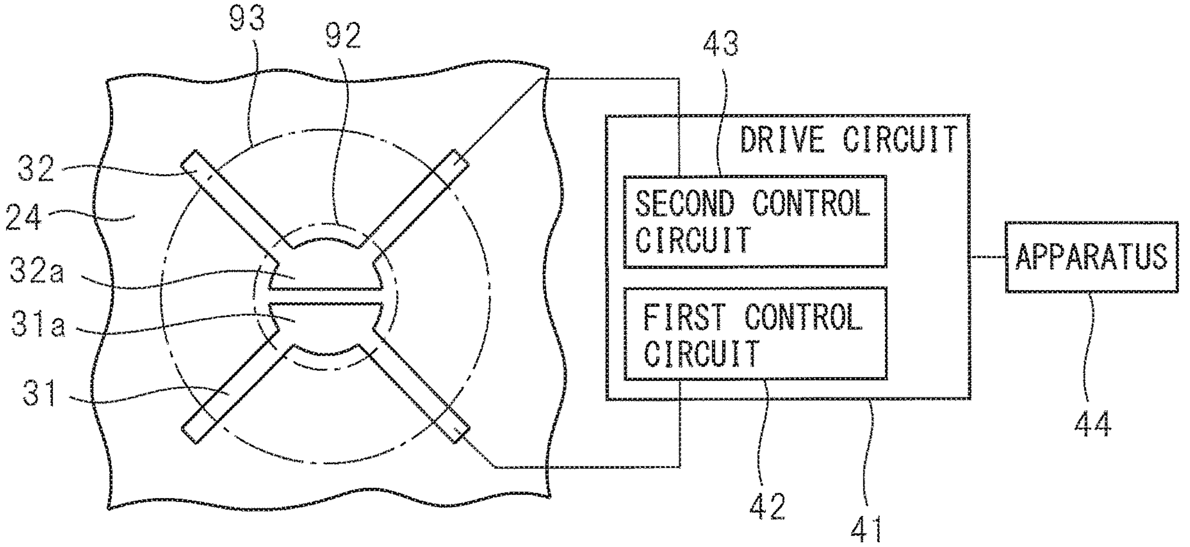
FIG. 8 is a view which explains patterns of electrodes of a first membrane sheet of an embodiment.

FIG. 8 is an explanatory view of patterns of the electrodes of the first membrane sheet. FIG. 8 is a bottom view of the upper layer 24. In the present embodiment, a plurality of electrodes each of which is included in different electrical circuits are formed for enabling connections of contact pairs with one operation of one keyswitch device 1. In the example of the upper layer 24 shown in FIG. 8, two upper electrodes 31 and 32 which are included in two different electrical circuits are formed. The upper electrode 31 has a contact 31a, while the upper electrode 32 has a contact 32a.

A region 92 shown in FIG. 8 is a region which is pushed by the pushing part 13b of the rubber cup 51. At the inside of the region 92, the contact parts 31a and 32a of the upper electrodes 31 and 32 and the corresponding contacts of the lower electrodes are brought into contact. Further, the region 93 is a region in the membrane sheet 23 where the hole 25a of the spacer 25 is formed. That is, the region 93 is a region where the upper layer 24 deforms when the membrane sheet 23 is pushed.

The contact 31a and contact 32a shown in FIG. 8 are respectively formed in semicircular planar shapes. Each of the contact part 31a and contact part 32a are formed so that at least its portion is arranged inside of the region 92. In FIG. 8, entire portions of the contact 31a and contact 32a are formed inside of the region 92.

The keyswitch device 1 in the present embodiment is arranged at a control device which controls an apparatus 44. The control device in the present embodiment includes a drive circuit 41. The keyswitch device 1 is included in the drive circuit 41. The drive circuit 41 is used to drive the apparatus 44. The drive circuit 41 in the present embodiment includes a plurality of electrical circuits, namely, a first control circuit 42 and second control circuit 43. In the present embodiment, the first control circuit 42 and the second control circuit 43 are mutually independent electrical circuits and are formed to output respective control signals.

The drive circuit 41 in the present embodiment drives the apparatus 44 according to the control signals when the control signal output from the first control circuit 42 and the control signal output from the second control circuit 43 match. That is, the drive circuit 41 in the present embodiment drives the apparatus 44 when both the first control circuit 42 and the second control circuit 43 are operating normally. The drive circuit 41 controls the apparatus 44 to stop if one or more of the first control circuit 42 and the second control circuit 43 experience an abnormality.

The first control circuit 42 has a first electrode that includes the upper electrode 31. Further, the second control circuit 43 has a second electrode that includes the upper electrode 32. By the contact part 31a of the upper electrode 31 and the corresponding contact part 30a of the lower electrode contacting each other, the contact pair of the first control circuit 42 is connected. Further, by the contact part 32a of the upper electrode 32 and the corresponding contact part of the lower electrode contacting each other, the contact pair of the second control circuit 43 is connected.

The rubber cup 51 which is shown in FIG. 6 to FIG. 8 is arranged between the keytop 10 and the membrane sheet 23. When the user pushes the keytop 10, the pushing part 10a of the keytop 10 pushes the abutting part 13a of the rubber cup 51 and the deforming part 13d of the rubber cup 51 deforms.

The pushing part 13b of the rubber cup 51 moves toward the membrane sheet 23 as shown by arrow 101. The pushing part 13b contacts the upper layer 24 of the membrane sheet 23 to push the upper layer 24. The deforming part 13e deforms when the pushing part 13b contacts the upper layer 24. The membrane sheet 23 deforms at the upper layer 24, and the plurality of the upper electrodes 31 and 32 which are formed at the upper layer 24 and the lower electrodes which are formed at the lower layer 26 and correspond to the upper electrodes 31 and 32 contact each other. That is, the mutually facing contacts of the upper electrodes and contacts of the lower electrodes individually contact each other and are electrically connected. In the present embodiment, the contact pair of the first control circuit 42 and the contact pair of the second control circuit 43 are substantially simultaneously connected.

When the user releases his or her finger from the keytop 10, the rubber cup 51 returns to its original shape, and the contact pair of first control circuit 42 and the contact pair of the second control circuit 43 open. The keyswitch device 1 in the present embodiment enables the contact pairs to be simultaneously connected or disconnected by a single operation of the keytop 10, as a plurality of contact pairs are arranged for a single keytop 10. In this case, the electrical circuits have contact pairs which are connected or disconnected individually for the respective electrical circuits.

In this regard, the keyswitch device 1 of the present embodiment has to connect a plurality of contact pairs when the pushing part 13b of the rubber cup 51 pushes the membrane sheet 23. For this reason, the membrane sheet 23 is preferably pushed more stably than with a keyswitch device which connects a single contact pair. For example, the keytop 10 preferably pushes the rubber cup 51 in a direction substantially vertical to the surface of the membrane sheet 23 as shown by arrow 101. That is, the pushing part 13*b* of the rubber cup 51 preferably pushes the center of the region where the contacts 31*a* and 32*a* are formed. Further, the amount of pushing of the keytop 10 is preferably made to an amount which is sufficiently large for the contacts of the upper electrodes and the contacts of the lower electrodes to contact each other.

In the keyswitch device 1 of the present embodiment, a gear link mechanism is employed as the support mechanism which supports the keytop 10. The support mechanism in the present embodiment is configured so that the drive of one link member enables the other link member to be driven through the tooth parts. For this reason, the keytop 10 can be kept from tilting while the keytop 10 is moving. The rubber cup 51 can be pushed in a direction substantially vertical to the surface of the membrane sheet 23. For example, even when the user pushes an end part of the keytop 10, the keytop 10 can be made to move in a direction substantially vertical to the surface of the membrane sheet 23. The keytop 10 can be used to stably push the rubber cup 51. For this reason, even if the membrane sheet 23 is formed with a plurality of contact pairs, the plurality of contact pairs can be connected or disconnected stably.

Furthermore, since the support mechanism in the present embodiment enables suppression of tilting of the keytop 10 and make the keytop 10 move in the desired direction, the amount of pushing of the rubber cup 51 can be increased. For example, even when the keytop 10 is pushed in a direction tilted from the direction vertical to the surface of the membrane sheet 23, the keytop 10 can move in a direction vertical to the surface of the membrane sheet 23 so as to keep the amount of movement of the keytop 10 from becoming smaller.

For example, in a keyswitch device which is not provided with link members and the rubber cup alone is used to support the keytop, the keytop may be pushed while in a slanted state. In such a state, the pushing part of the rubber cup may be deviated from the center of the region in which the contacts are arranged, and the contact pair cannot be connected. For example, if the pushing part of the rubber cup pushes a position which deviates from the center of the hole of the spacer, one of the contact pairs may not be connected even if the other contact pair is connected. As opposed to this, the keyswitch device of the present embodiment can stably connect and disconnect the mutually independent contact pairs.

The gear link in the present embodiment comprises link members which are arranged in a V-shape when viewed by a side view, but the invention is not limited to this. The embodiment may also have a mechanism by which link members engage through the tooth parts (gears).

The electrodes of the upper layer 24 and the lower layer 26 of the membrane sheet 23 may be formed by any methods. The upper layer 24 and the lower layer 26 in the present embodiment are formed by polyethylene terephthalate (PET) films. Further, the upper electrodes and the lower electrodes are formed by printing the surfaces of these layers with conductor paste. Alternatively, the lower layer 26 may be formed with electrodes by etching of the circuit board or other board. For example, by forming a copper film on the surface of the lower layer 26, coating a resist which corresponds to the shapes of the lower electrodes, and etching, it is also possible to remove the unnecessary parts of the copper film and form the desired shapes of the lower electrodes.

The upper electrodes and lower electrodes in the first membrane sheet 23 have contacts which are formed into semispherical parts, but the invention is not limited to this. Electrodes of any patterns can be formed. Next, other shapes of the contacts of the electrodes will be illustrated.

Figure 9:
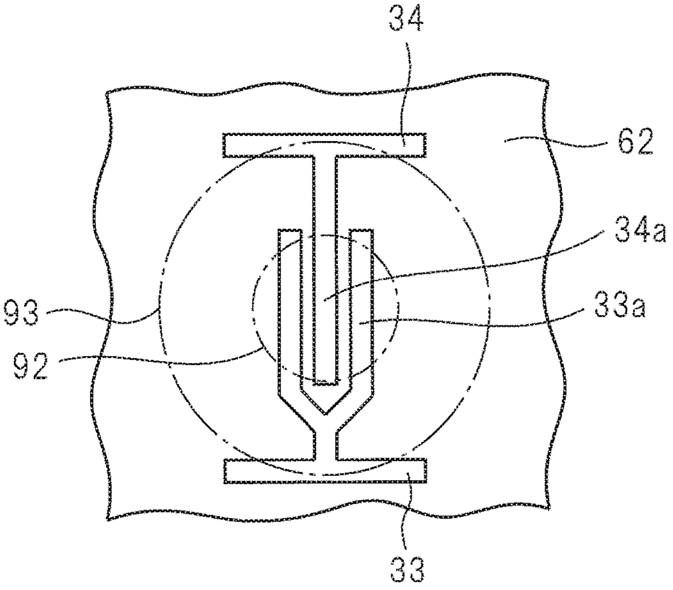
FIG. 9 is a view which explains patterns of electrodes of a second membrane sheet of an embodiment.

FIG. 9 is a bottom view of the upper layer of a second membrane sheet in the present embodiment. The upper layer 62 of the second membrane sheet includes the upper electrodes 33 and 34. The contact 33*a* of the upper electrode 33 and the contact 34*a* of the upper electrode 34 are formed in linear shapes. The contact 33*a* and the contact 34*a* are formed so as to extend in parallel with each other and are arranged so as to be alternately aligned. At the inside of the region 92 where the pushing part 13*b* of the rubber cup 51 pushes, the contact 33*a* and the contact 34*a* are arranged so as to face each other.

Figure 10:
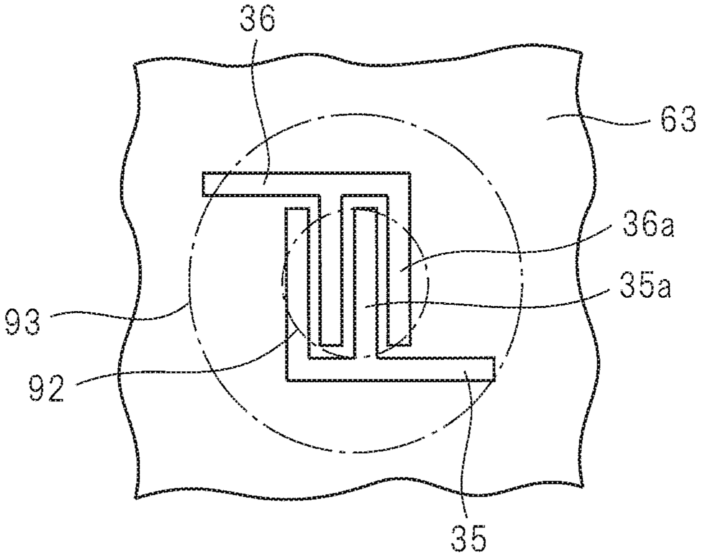
FIG. 10 is a view which explains patterns of electrodes of a third membrane sheet of an embodiment.

FIG. 10 is a bottom view of an upper layer of a third membrane sheet in the present embodiment. The upper layer 63 of the third membrane sheet includes upper electrodes 35 and 36. Similar to the electrodes of the second membrane sheet, the contact part 35*a* of the upper electrode 35 and the contact part 36*a* of the upper electrode 36 are formed into linear shapes. Further, the contact 35*a* and the contact 36*a* are arranged so as to be alternately aligned.

Figure 11:
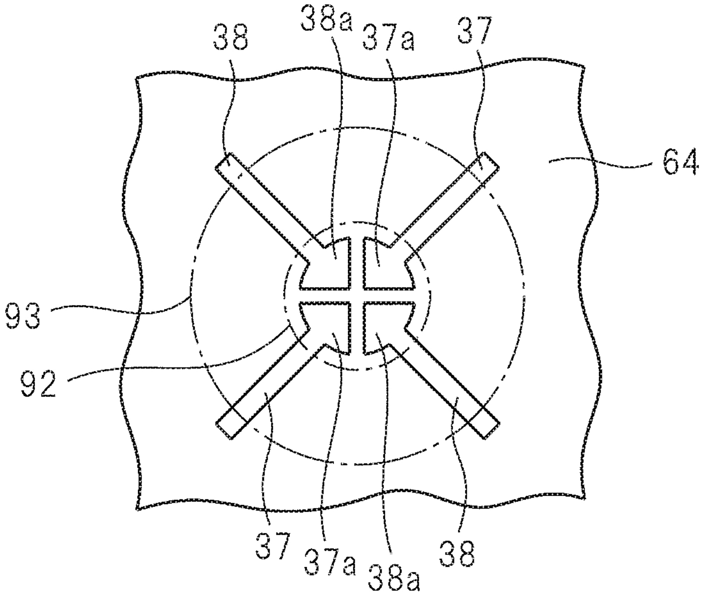
FIG. 11 is a view which explains patterns of electrodes of a fourth membrane sheet of an embodiment.

FIG. 11 is a bottom view of an upper layer of a fourth membrane sheet in the present embodiment. The upper layer 64 of the fourth membrane sheet includes upper electrodes 37 and 38 having contacts 37*a* and 38*a*, respectively. The contacts 37*a* and 38*a* are formed with fan shapes. The upper electrode 37 is branched into two pieces and two contacts 37*a* are formed. The electrode 38 is branched into two pieces and two contacts 38*a* are formed. The two contact parts 37*a* are the same in potential and are arranged so as to face each other. Further, the two contact parts 38*a* are the same in potential and are arranged so as to face each other. The respective contact parts 37*a* and 38*a* have shapes of a circle divided into four equal parts. The contact parts 37*a* and contact parts 38*a* are arranged alternating with each other along the circumferential direction.

Figure 12:
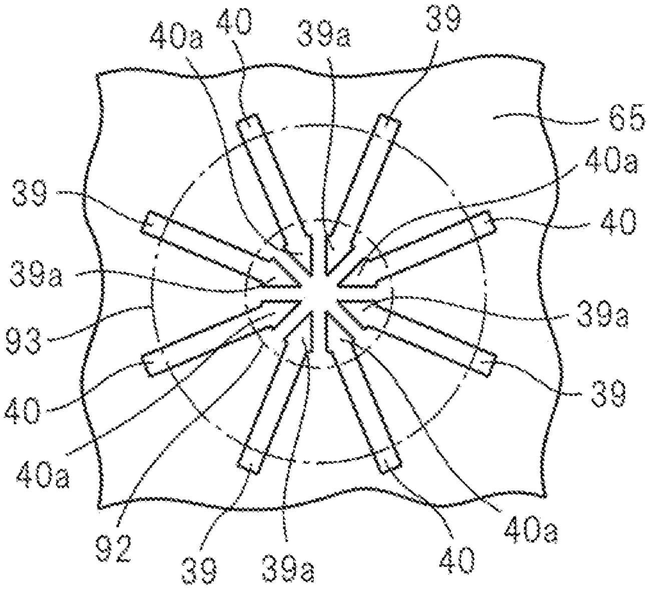
FIG. 12 is a view which explains patterns of electrodes of a fifth membrane sheet of an embodiment.

FIG. 12 is a bottom view of the upper layer of a fifth membrane sheet in the present embodiment. The upper layer 65 of the fifth membrane sheet includes the upper electrodes 39 and 40. Similar to the electrodes of the fourth membrane sheet, the upper electrode 39 is branched into four pieces and four contacts 39*a* are formed, and the upper electrode 40 is branched into four pieces and four contacts 40*a* are formed. The four contact parts 39*a* are the same in potential. Further, the four contact parts 40*a* are the same in potential. The contact parts 39*a* and contact parts 40*a* are respectively formed into fan shapes. The respective contact parts 39*a* are 40*a* have shapes of a circle divided into eight equal parts.

The shapes of the contact parts of the electrodes may employ shapes obtained by dividing circles or other geometric shapes or linear shapes. Further, when one electrode includes a plurality of contact parts, rather than have the contact parts arranged adjoining each other, it is preferable to arrange them dispersed within the region 92 which is pushed by the pushing part 13*b* of the rubber cup 51.

Next, the rubber cup of the keyswitch device in the present embodiment will be explained. The deforming part 13*e* and pushing part 13*b* of the first rubber cup 51 shown in FIGS. 4 to 6 are formed in conical shapes, but the invention is not limited to this. The pushing part of the rubber cup may employ any shape which can push the membrane sheet 23.

Figure 13:
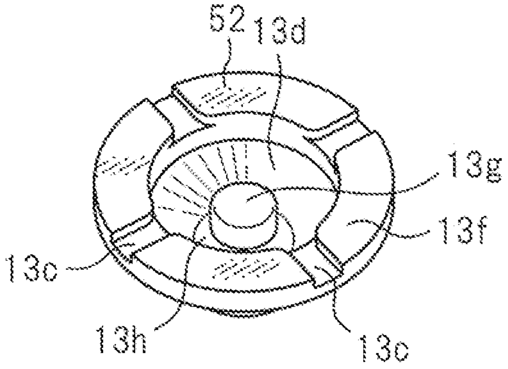
FIG. 13 is a perspective back side view of a second rubber cup of an embodiment.

FIG. 13 is a perspective view of the second rubber cup in the present embodiment when seen from the back side. The second rubber cup 52 has a columnar shaped pushing part 13*g* and a deforming part 13*h*. The pushing part 13*g* is formed so that the surface which pushes the membrane sheet 23 becomes a planar surface. The second rubber cup 52 can push the membrane sheet 23 over a wide area.

Figure 14:
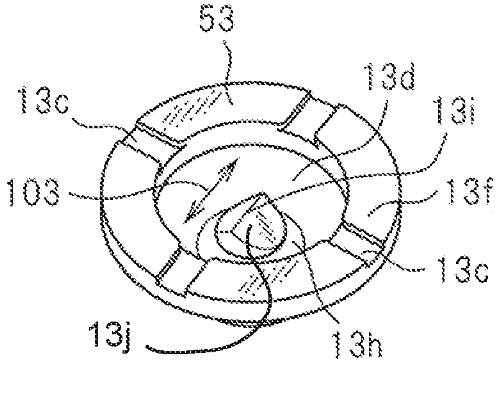
FIG. 14 is a perspective back side view of a third rubber cup of an embodiment.

FIG. 14 is a perspective view of the third rubber cup in the present embodiment when seen from the back side. The third rubber cup 53 includes a pushing part 13*i*. The pushing part 13*i* has a substantially three-sided prismatic shape when seen by a perspective view as shown in FIG. 14. The top part of the pushing part 13*i* has a ridge which extends straight in a single direction shown by arrow 103. The top part which extends in a line in the pushing part 13*i* faces the membrane sheet 23. The pushing part 13*i* has a V-shaped cross-sectional shape when cut in a direction vertical to the direction in which the ridge extends.

Figure 15:
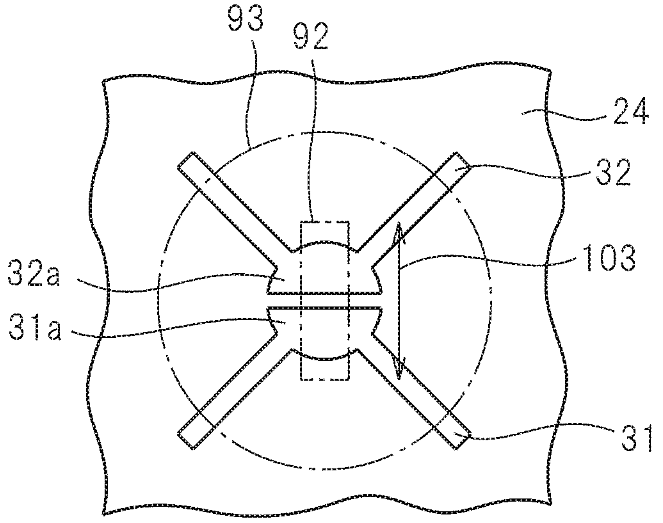
FIG. 15 is a view when arranging the third rubber cup at the first membrane sheet of an embodiment.

FIG. 15 is a view which explains the direction of arrangement of the third rubber cup in the present embodiment. FIG. 15 shows the upper layer 24 of the first membrane sheet (see FIG. 8). The contact parts 31*a* and 32*a* of the upper electrodes 31 and 32 of the first membrane sheet 23 face each other. The third rubber cup 53 is preferable for electrodes where contact parts 31*a* and 32*a* face each other as illustrated in FIG. 15. When using the third rubber cup 53, the region 92 of the upper layer 24 which is pushed by the pushing part 13*i* becomes rectangular. The region 92 has a shape which extends corresponding to the straight top part of the pushing part 13*b* as shown by arrow 103. In the example of FIG. 15, the rubber cup 53 is arranged so that the direction in which the top part of the pushing part 13*b* of the rubber cup 53 extends and the direction in which the contact part 31*a* and the contact part 32*a* face each other become substantially parallel. Due to this configuration, it is possible to more stably push the plurality of contact parts.

In the first rubber cup 51 shown in FIG. 5 and FIG. 6, the pushing part 13*b* is pointed, so pushes the membrane sheet 23 in a point manner. For this reason, sometimes part of the contact pairs among the plurality of contact pairs will not be sufficiently stably connected. For example, in the upper layer 24 of the first membrane sheet shown in FIG. 8, the first rubber cup 51 pushes the membrane sheet 23 centered about the region between the contact part 31*a* and the contact part 32*a*. For this reason, sometimes the pushing operation of the contact part 31*a* or the contact part 32*a* becomes insufficient.

Further, in the second rubber cup 52 shown in FIG. 13, the pushing part 13*g* is formed in a columnar shape. The second rubber cup 52 is planar in shape at the part which pushes the membrane sheet 23. For this reason, it is possible to push the membrane sheet 23 over a large region, but the force of pushing the membrane sheet 23 is dispersed and sometimes the upper layer 24 insufficiently deforms.

As opposed to this, in the third rubber cup 53 in the present embodiment, the region which pushes the membrane sheet 23 becomes rectangular in shape. The membrane sheet can be pushed over a wider range than the first rubber cup 51. Further, with the second rubber cup 52, since the top part of the pushing part 13*g* is planar, the force is dispersed, while with the third rubber cup 53, the top part of the pushing part 13*i* is linear, so dispersion of the force can be suppressed. As a result, the contact part of the upper electrode and the contact part of the lower electrode can be made to contact more reliably. In particular, by arranging the third rubber cup 53 so that the top part of the pushing part extends along the direction in which the contact parts face each other, the contact parts can be made to contact each other more reliably and the plurality of contact pairs can be connected more stably.

Figure 16:
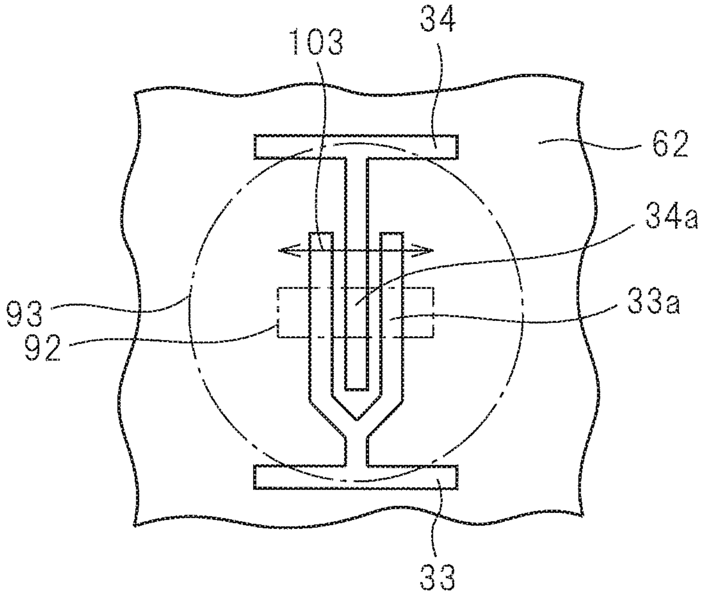
FIG. 16 is a view when arranging the third rubber cup at the second membrane sheet of an embodiment.

FIG. 16 is a view which explains the direction of arrangement of the third rubber cup in the present embodiment. FIG. 16 shows the upper layer 62 of the second membrane sheet (see FIG. 9). The contact parts 33*a* and 34*a* of the upper electrodes 33 and 34 of the second membrane sheet are formed into linear shapes and are arranged in parallel with each other. The third rubber cup 53 is suitable even for electrodes which a plurality of contact parts 33*a* and 34*a* extend in a single direction.

The third rubber cup 53 can be arranged so that the longitudinal direction of the region 92 by which the pushing part 13*i* pushes the membrane sheet 23 becomes substantially parallel with the direction in which the plurality of contact parts 33*a* and 34*a* face each other. That is, the third rubber cup 53 enables the direction in which the linear top part of the pushing part 13*i* extends to be set vertical to the direction in which the contact parts 33*a* and 34*a* extend. In this configuration as well, the contact parts can be made to contact each other more reliably and a plurality of contact pairs can be connected more stably.

Figure 17:
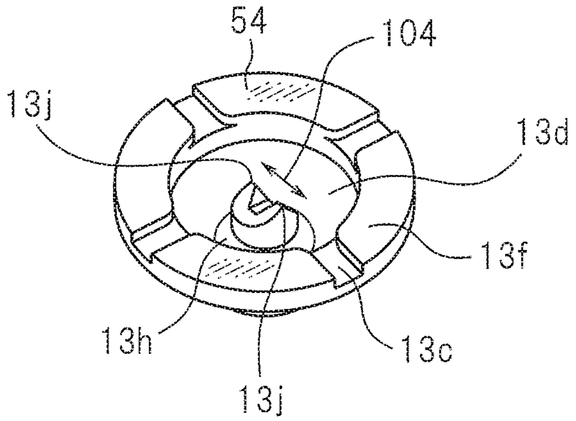
FIG. 17 is a perspective back side view of a fourth rubber cup of an embodiment.

FIG. 17 is a perspective view when viewing the fourth rubber cup in the present embodiment when seen from the back side. The fourth rubber cup 54 has two pushing parts 13*j*. The respective pushing parts 13*j* are formed to be pointed. The two pushing parts 13*j* are arranged aligned in the direction which is shown by arrow 104. The fourth rubber cup 54 can push the membrane sheet 23 centered about the plurality of pushing parts 13*j*.

Figure 18:
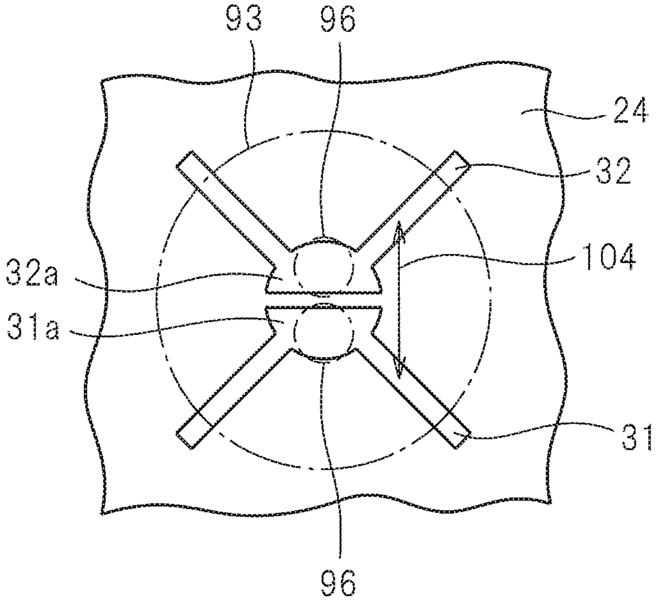
FIG. 18 is a view when arranging the fourth rubber cup at the first membrane sheet of an embodiment.

FIG. 18 is a view which explains the direction of arrangement of the fourth rubber cup in the present embodiment. FIG. 18 shows the upper layer 24 of the first membrane sheet 23 (see FIG. 8). The fourth rubber cup 54 is arranged so that the direction in which the two pushing parts 13*j* are arranged, shown by arrow 104, and the direction in which the plurality of contact parts 31*a* and 32*a* face each other become substantially parallel. The regions 96 which are pushed by the pushing parts 13*j* of the rubber cup 54 can be arranged right over the contact parts 31*a* and 32*a*. In this way, it is possible to form a plurality of pushing parts 13*j* so as to correspond to the positions of the plurality of contact parts 31*a* and 32*a*. Due to this configuration, it is possible to electrically connect the plurality of contact pairs more reliably.

Figure 19:
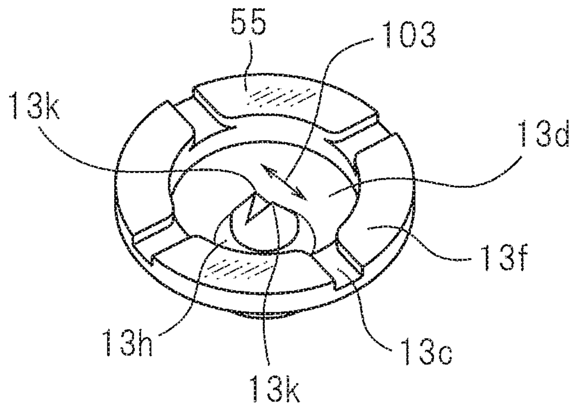
FIG. 19 is a perspective back side view of a fifth rubber cup of an embodiment.

FIG. 19 is a perspective view of the fifth rubber cup in the present embodiment when seen from the back side. The fifth rubber cup 55 has a plurality of pushing parts 13*k*. The pushing parts 13*k* have pointed front ends and are formed into peak shapes. In the fifth rubber cup 55 as well, in the same way as the fourth rubber cup, the plurality of pushing parts 13*k* can be formed so as to correspond to the positions of the plurality of contact parts 31*a*, 32*a* of the upper electrodes 31 and 32.

Figure 20:
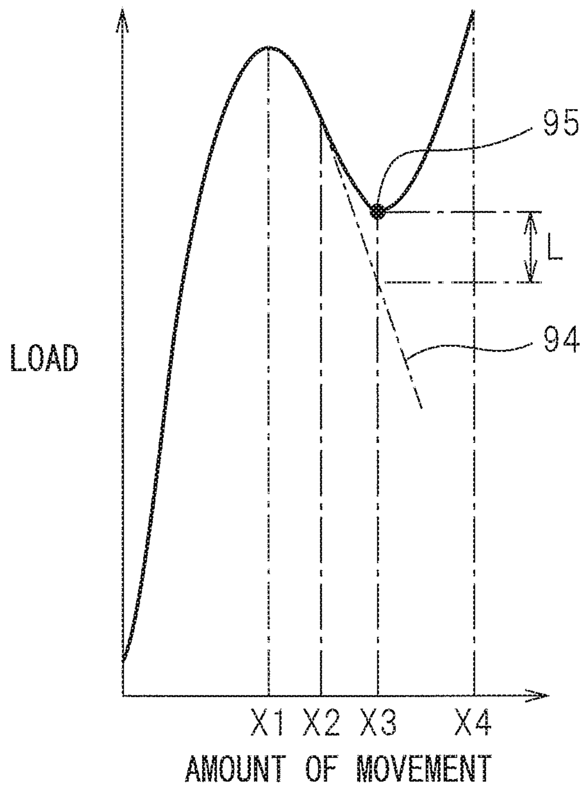
FIG. 20 is a graph which shows the push characteristics of a keyswitch device of an embodiment.

Next, push characteristics of the keyswitch device in the present embodiment will be explained. FIG. 20 is a graph shows the load when operating the keyswitch device in the present embodiment. FIG. 20 is a graph of the push characteristics. The abscissa shows the amount of movement of the keytop 10, while the ordinate shows the load when pushing the keytop 10. The keytop 10 is formed to be able to move up to the amount of movement X4. That is, X4 corresponds to the stroke of the keytop 10.

Figure 21:
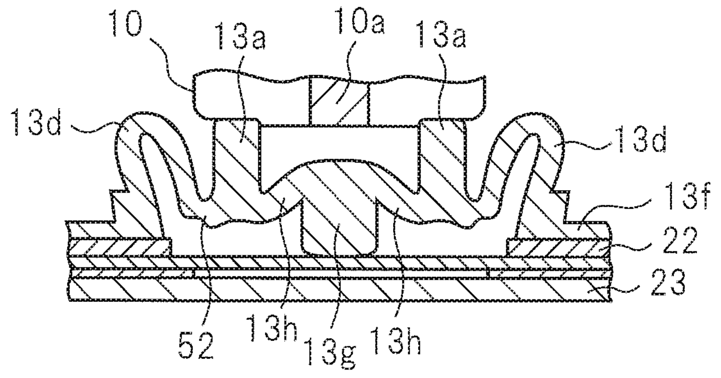
FIG. 21 is a cross-sectional view of a part of a rubber cup when pushing down a keyswitch device of an embodiment.

FIG. 21 is a cross-sectional view of the rubber cup pushing the keyswitch device in the present embodiment. FIG. 21 shows the second rubber cup (see FIG. 13). The second rubber cup 52 has a columnar shaped pushing part 13*g*. The pushing part 13*g* pushes the membrane sheet 23.

As shown in FIG. 20 and FIG. 21, when the user starts to push the keytop 10, the load gradually increases. Up until the amount of movement of the keytop 10 becomes X1, deformation of the outside deforming part 13*d* increases the load. Further, at the amount of movement X1, the deforming part 13*d* buckles and deforms, so when the amount of movement exceeds X1, the load will fall.

Next, when the amount of movement reaches X2, the pushing part 13*g* of the rubber cup 52 contacts the upper layer 24 of the membrane sheet 23. Due to the pushing part 13*g* pushing the membrane sheet 23, the upper layer 24 deforms and a force is generated in an opposite direction to the direction of pushing the membrane sheet 23. Further, the inside deforming part 13*h* deforms and balances with the force due to the membrane sheet 23. The force due to deformation of the deforming part 13*h* is transmitted to the abutting part 13*a* and corresponds to part of the load. At the amount of movement X3, the load due to deformation of the deforming parts 13*d* and 13*h* becomes local minimum value. Further, in the example shown in FIG. 20, at the amount of movement X3, the contact part of the upper electrode of the membrane sheet 23 contacts the contact part of the lower electrode. That is, electrical connection is achieved by a local minimum point 95 of load.

When the keytop 10 is further pushed and the amount of movement becomes larger than X3, the force in a direction opposite to the direction of pushing the membrane sheet 23 becomes larger and the load rises until the amount of movement becomes X4. The auxiliary line 94 shows the load in the case where there is no deforming part 13*h*. Further, the load L shows the load for causing deformation of the upper layer 24 of the membrane sheet 23.

When pushing the keytop 10, if electrical connection is obtained by an amount of movement of the local minimum point 95 of the load or an amount of movement smaller than the local minimum point 95, a good feeling of operation can be obtained. On the other hand, if electrical connection is achieved by an amount of movement larger than the amount of movement of the local minimum point 95 of the load when the keytop 10 is pushed, sometimes an odd feeling arises in operation. For example, if the upper layer 24 of the membrane sheet 23 is large in elasticity, the amount of deformation of the deforming part 13*h* up until the contact part of the upper electrode and the contact part of the lower electrode contact will become larger. That is, the amount of movement of the keytop 10 when electrical connection is achieved becomes larger. In this case, the electrical connection is achieved by a range of amount of movement larger than the local minimum point 95 of the load and an odd feeling arises in operation.

Further, if the position at which electrical connection is achieved is too deep, sometimes the amount by which the keytop 10 is pushed will be insufficient and electrical connection will not be achieved. In particular, sometimes, when the keytop 10 is not sufficiently pushed, electrical connection will not be achieved. For example, in a keyboard 81 which has a plurality of keyswitch devices 1, the keyswitch devices 1 which are arranged at the outer periphery of the keyboard 81 will sometimes be pushed by a smaller force than the keyswitch devices 1 which are arranged at the center part of the keyboard 81. If the position of electrical connection is too deep, sometimes electrical connection will not be sufficiently achieved in the keyswitch devices 1 which are arranged at the outer periphery.

In the keyswitch device 1 of the present embodiment, the upper layer 24 is formed so as to give an elastic force whereby electrical connection is achieved in the region of not more than the amount of movement of local minimum point 95. Further, the deforming part 13*h* is formed so as to give an elastic force whereby electrical connection is achieved in a region of not more than the amount of movement of the local minimum point 95. In this way, the membrane sheet 23 and rubber cup 52 in the present embodiment are selected in shape or material so that electrical connection is obtained by an amount of movement of less than the local minimum point 95 of the load. Due to this configuration, it is possible to operate the keyswitch device by a good operating feeling. Alternatively, it is possible to achieve electrical connection reliably.

Further, while pushing the membrane sheet 23, the pushing part of the rubber cup will sometimes deform. For example, the first rubber cup 51 shown in FIG. 6 has a shape with a pointed pushing part 13*b*. For this reason, the pushing part 13*b* both pushes the membrane sheet 23 and deforms. Due to deformation of the pushing part 13*b*, a force is generated in an opposite direction to the direction pushing the keytop 10.

Even when using a rubber cup which has such a deformable pushing part, in the push characteristics of the keytop, it is preferable to achieve electrical connection in a region of not more than the amount of movement of the local minimum point 95 of the load. That is, the pushing part is preferably selected to a material and shape by which electrical connection is achieved in a region of not more than the amount of movement of the local minimum point 95.

For example, as shown in FIG. 7, in the membrane sheet 23 in the present embodiment, the diameter “d” of the hole 25*a* of the spacer 25 is formed to be 4.3 mm. The gap G between the contact part 31*a* and the contact part 30*a* is formed to be 50 μm. The upper layer 24 is formed by a PET film with a thickness of about 75 μm. By forming such a membrane sheet 23, in a single contact pair, the contact part of the upper electrode and the contact part of the lower electrode can be made to contact each other by a load of 20 g or less. As a result, in the push characteristics, it is possible to obtain electrical connection in a region of not more than the amount of movement of the local minimum point 95.

The contact part of the upper electrode and the contact part of the lower electrode in the present embodiment have substantially the same shapes, but the invention is not limited to this. It is sufficient that it be formed so that the contact part of the upper electrode and the contact part of the lower electrode can contact each other. For example, the shape of the contact part of the upper electrode and the shape of the contact part of the lower electrode may be different from each other.

Further, as the support mechanism which supports the keytop in the above-mentioned keyswitch device, a gear link mechanism is employed, but the invention is not limited to this. A pantograph mechanism may also be employed.

Figure 22:
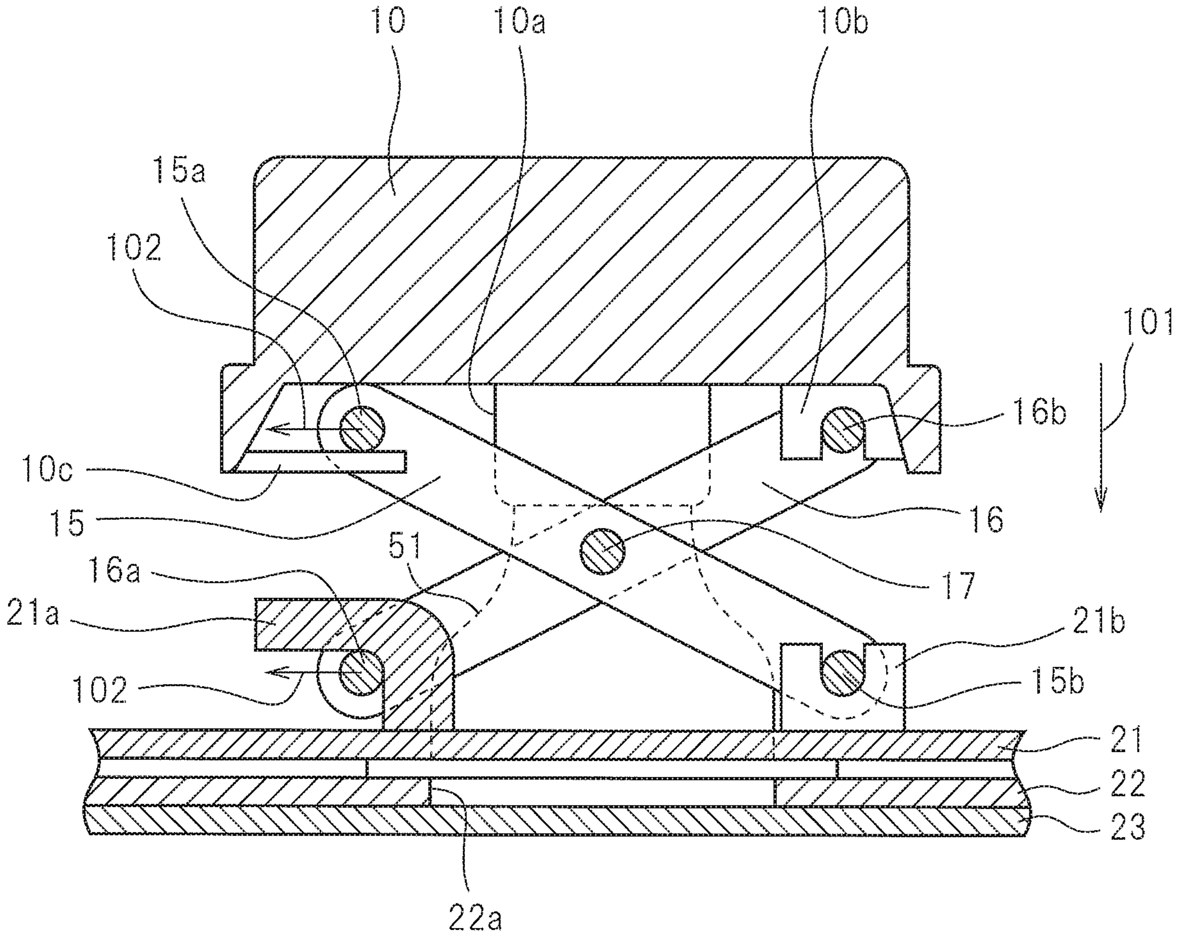
FIG. 22 is a view which explains another support mechanism of a keytop of a keyswitch device of an embodiment.

FIG. 22 is a cross-sectional view of another keyswitch device in the present embodiment. The other keyswitch device shown in FIG. 22 employs a support member, which is a pantograph mechanism which supports the keytop 10. The keytop 10 is supported at the base member 21 through the plurality of link members 15 and 16. At the downside of the base member 21, the support member 22 and membrane sheet 23 are arranged. Between the keytop 10 and the support member 22, an elastic member, namely the rubber cup 51 is arranged.

The link members 15 and 16 have slide shafts 15*a* and 16*a* at one ends. The link members 15 and 16 have pivot shafts 15*b* and 16*b* at the other ends. The slide shafts 15*a* are slidably supported at the frames 10*c* which are formed at the keytop 10. The slide shafts 16*a* are slidably supported at the frames 21*a* which are formed at the base member 21. The pivot shaft 15*b* is pivotally supported at an insert part 21*b* which is formed in the base member 21. The pivot shaft 16*b* is pivotally supported at an insert part 10*b* which is formed in the keytop 10.

The link member 15 and the link member 16 are arranged so as to intersect each other when viewed by a side view. The link members 15 and 16 are supported by the support shaft 17. The support shaft 17 is arranged at a part where the link members 15 and 16 intersect. The link members 15 and 16 engage with each other through the support shaft. The part where the link members 15 and 16 intersect and the support shaft 17 is arranged corresponds to the engagement part.

In the pantograph mechanism, when the keytop 10 is pushed in the direction shown by arrow 101, the slide shafts 15*a* and 16*a* move in the directions shown by arrows 102. Further, the rotary shafts 15*b* and 16*b* turn and the link members 15 and 16 are driven. As the link members 15 and 16 are engaged through the support shaft 17, when one link member is driven, the other link member is driven linked with this through the support shaft 17. For example, if an end part of the keytop 10 is pushed and the link member 15 starts to be driven, the link member 16 is also driven through the support shaft 17. Due to the linkage of the link members 15 and 16, the keytop 10 can be made to move in a direction substantially vertical to the surface of the membrane sheet 23.

In this way, even when the support mechanism of the keytop is a pantograph mechanism, it is possible to stably push the rubber cup in the same way as the gear link mechanism. Even when connecting a plurality of contact pairs by a single operation in the membrane sheet 23, stable connection can be achieved.

The keyboard and keyswitch device in the present embodiment can, for example, be suitably used for the control panel of industrial machinery or the control panel of medical equipment, etc. The keyswitch device in the present embodiment is arranged at a keyboard, but the invention is not limited to this. It is possible to employ it for any keyswitch device which performs key input. Note that, when arranging a plurality of keyswitch devices at a keyboard, the plurality of rubber cups may also be integrally formed.

The above embodiments may be suitably combined. In the above figures, the same or corresponding parts are assigned the same reference numerals. Note that the above embodiments are illustrations and do not limit the invention. Further, in the embodiments, the changes which are shown in the claims are included.

The invention claimed is:

1. A reaction force generating member that contacts an upper layer of a membrane sheet, comprising:

a first dome, having a first load displacement characteristic, that gives a reaction force to an operation member according to a depression of the operation member; and a second dome, having a second load displacement characteristic, that includes a bowl part disposed inside the first dome, and a projection projecting downward from a center of the bowl part and depressing a switch disposed below the operation member, wherein the first load displacement characteristic increases a depression load of the operation member until the first dome performs buckling deformation according to depression of the operation member, the depression load of the operation member reaches a peak load, and the depression load of the operation member decreases after the buckling deformation, the second load displacement characteristic, combined with deformation of the upper layer of the membrane sheet, increases the depression load of the operation member nonlinearly according to a depression amount of the operation member, and when the depression load of the operation member in a total of the first load displacement characteristic, the second load displacement characteristic and the deformation of the upper layer of the membrane sheet decreases after the peak load and before the depression load of the operation member reaches a bottom load which is a minimum load after the peak load, the projection turns on the switch, and wherein the second load displacement characteristic has a load increase rate that increases as the depression amount of the operation member increases.

2. The reaction force generating member as claimed in claim 1, wherein the first dome performs buckling deformation, and the second dome never performs the buckling deformation.

3. The reaction force generating member as claimed in claim 2, wherein the projection is in contact with the switch simultaneously with or immediately after the first dome performs the buckling deformation.

4. A key switch device comprising:

an operation member to be depressed;

a switch, disposed under the operation member, including a membrane sheet with an upper layer; and a reaction force generating member, provided between the operation member and the switch, including:

- a first dome that gives a reaction force to the operation member according to depression of the operation member; and
- a second dome that includes a bowl part disposed inside the first dome, and a projection projecting downward from a center of the bowl part and depressing the switch disposed below the operation member, wherein the switch is turned on when an amount of an input stroke of the operation member is larger than a first amount of the input stroke corresponding to a peak load and smaller than a second amount of the input stroke corresponding to a bottom load after the peak load, and wherein the second dome, combined with deformation of the upper layer of the membrane sheet, has a load displacement characteristic in which a load increase rate increases as the depression amount of the operation member increases.

5. The key switch device as claimed in claim 4, wherein the projection is in contact with the switch simultaneously with or immediately after the stroke of the operation member reaches the first stroke.

* * * * *